US012688456B2

(12) United States Patent
Mirmomeni et al.

(10) Patent No.:     US 12,688,456 B2
(45) Date of Patent:          Jul. 21, 2026

(54) SECURE AND FAIR COMPETITIVE BIDDING

(71) Applicant: International Business Machines Corporation, Armonk, NY (US)

(72) Inventors: Mahtab Mirmomeni, Vermont South (AU); John Maxwell Cohn, Richmond, VT (US); Gustavo Alejandro Stolovitzky, Riverdale, NY (US); Stefan Harrer, Sandringham (AU)

(73) Assignee: International Business Machines Corporation, Armonk, NY (US)

( * ) Notice: Subject to any disclaimer, the term of this patent is extended or adjusted under 35 U.S.C. 154(b) by 667 days.

(21) Appl. No.: 17/670,780

(22) Filed: Feb. 14, 2022

(65) Prior Publication Data

US 2023/0259811 A1     Aug. 17, 2023

(51) Int. Cl.
| | |
|---|---|
| *G06N 20/00* | (2019.01) |
| *G06F 8/10* | (2018.01) |
| *G06F 18/21* | (2023.01) |

(52) U.S. Cl.
CPC .............. *G06N 20/00* (2019.01); *G06F 8/10* (2013.01); *G06F 18/2163* (2023.01); *G06F 18/217* (2023.01)

(58) Field of Classification Search
CPC ... G06N 20/00; G06F 18/217; G06F 18/2163; G06F 8/10
See application file for complete search history.

(56) References Cited

U.S. PATENT DOCUMENTS

| | | |
|---|---|---|
| 6,659,861 B1 | 12/2003 | Faris et al. |
| 7,430,523 B1 | 9/2008 | Khalidi |
| 9,965,782 B2 | 5/2018 | Sampsell |
| | (Continued) | |

FOREIGN PATENT DOCUMENTS

WO          2019245182 A1     12/2019

OTHER PUBLICATIONS

Roy et al., "Evaluation of artificial intelligence systems for assisting neurologists with fast and accurate annotations of scalp electroencephalography data", Elsevier, Mar. 18, 2021, pp. 1-11.

*Primary Examiner* — Jeremy L Stanley
(74) *Attorney, Agent, or Firm* — Scully, Scott, Murphy & Presser, P.C.; Gavin Giraud

(57)          ABSTRACT

There are provided a system, a method and computer program product providing a data-to-model challenge platform for enabling bidders publicly build, test, evaluate, validate and optimize AI models on proprietary data while at the same time avoiding the need to grant them access to the data itself. Rather, the bidder develops analytics on the enterprise's data to solve a task desirable to the organization and submits the analytics for evaluation against other bidders. The offering organization evaluates all submissions from the bidders and rank submissions against each other using the same metrics, wherein the metrics for selecting the winning bidder can include response time, number and rate of attempts to solve the analytics, quality of results, code compactness, team size etc. Allowing the submissions of the bidders to be visible only to the offering organization can occur subject to an agreement that the offering organization and the bidder sign.

15 Claims, 8 Drawing Sheets

200

Buyer publishes description of the project challenge on the secure bidding system infrastructure
205

Buyer receive/proces Bidder agreement
210

Bidders develop/modify analytical models without directly accessing the buyer's data; input model programs into container
215

Bidder submits and Buyer receives container and uploads submitted model
220

Conduct model training using training data set
225

Evaluate model using validation data set; Report results back to bidders via container
220

Last iteration?
240    No

Yes

Evaluate all models using a final data set against same set of metrics
250

Rank evaluated models
255

Buyer receives a ranked list of bidders against each defined metric
260

(56) References Cited

U.S. PATENT DOCUMENTS

| | | | |
|---|---|---|---|
| 10,068,304 | B1 | 9/2018 | Shuklabaidya et al. |
| 11,164,107 | B1* | 11/2021 | Craib ..................... G06N 20/00 |
| 2018/0330296 | A1 | 11/2018 | Park |
| 2019/0372935 | A1* | 12/2019 | Fink .................... H04L 63/0263 |
| 2021/0042645 | A1* | 2/2021 | Sharma ............... G06F 16/2379 |
| 2021/0042771 | A1* | 2/2021 | Sharma ................. G06N 20/00 |
| 2021/0150358 | A1* | 5/2021 | Lansel .................. G06F 18/217 |
| 2021/0174130 | A1* | 6/2021 | Austin ................... G06N 20/20 |
| 2021/0256418 | A1* | 8/2021 | Creedon .................. G06N 3/08 |
| 2021/0350274 | A1* | 11/2021 | Pfitzmann ........... G06F 11/3409 |
| 2021/0357819 | A1* | 11/2021 | Levacher ............... G06N 20/20 |
| 2021/0397892 | A1* | 12/2021 | Huang ............... G06F 18/2148 |
| 2022/0321541 | A1* | 10/2022 | Zhao ...................... G06N 20/00 |
| 2022/0398341 | A1* | 12/2022 | Diaz-Mitoma ..... G06F 21/6245 |
| 2023/0237349 | A1* | 7/2023 | Donoho ................ G06Q 40/08 |
| | | | 706/46 |

* cited by examiner

50

70

Competitive Phase
72

Evaluation Phase
75

Final Scoring Phase
78

200

Buyer publishes description
of the project challenge on
the secure bidding system
infrastructure
205

↓

Buyer receive/proces
Bidder agreement
210

↓

Bidders develop/modify
analytical models without
directly accessing the buyer's
data; input model programs
into container
215

↓

Bidder submits and Buyer
receives container and
uploads submitted model
220

↓

Conduct model training
using training data set
225

↓

Evaluate model using
validation data set;
Report results back to bidders
via container
220

Last
iteration?
240      No →

Yes ↓

Evaluate all models using
a final data set against
same set of metrics
250

↓

Rank evaluated models
255

↓

Buyer receives a ranked
list of bidders against each
defined metric
260

| TEAM 403 | EVALUATION METRIC 406 | SENSITIVITY 409 | FA/24 HOURS 412 | 415 |
|---|---|---|---|---|
| 1 | 1.94 | 53.25 | 104.06 | ... |
| 2 | 3.21 | 65.4 | 211.08 | ... |
| 3 | 3.51 | 14.68 | 51.54 | ... |
| 4 | 3.51 | 45.79 | 161.31 | ... |
| 5 | 3.7 | 57.45 | 215.83 | ... |
| 6 | 5.93 | 45.16 | 268.33 | ... |
| 7 | 7.14 | 55.64 | 398.24 | ... |

SECURE AND FAIR COMPETITIVE BIDDING

BACKGROUND

This disclosure relates generally to a bidding system and bidding process, and particularly to a secure and fair competitive bidding system that allows bidders to develop solutions for an organization without directly accessing the organization's data.

BACKGROUND OF THE INVENTION

Competitive bidding is a process in which companies bid to perform a certain project for an organization. Organizations need to evaluate the bidders against the same criteria to make a decision on which bidder will win the project. Ideally the organizations want the bidders to perform a small part of the project to get a sense of how the bidder will perform if selected. Current bidding systems require the organization to enable access to their data in order to evaluate a bidder against the analytics they can develop on their data or resort to redacted versions of the data.

An open-source repository of data sets such as provided by Kaggle® (service mark of Google, L.L.C.) is available that can be used for research and competition.

SUMMARY

There are provided a system, a method and a computer program product for providing a competitive bidding infrastructure enabling bidders to develop solutions for an organization without directly accessing the organization's data by enabling a model to data paradigm.

The system and methods enable the bidders' performance to be evaluated side by side on a realistic task and data that is meaningful to the offering organization against the same metrics, which will result in a secure and fair comparison between the bidders.

In one embodiment, there is provided a method for a secure bidding process for bidding teams. The method comprises: providing, via a communications portal to a provider's secure computing system, a challenge specification requiring a bidding team to create a data science model solution (model) for a provider based on a provider's data set; receiving, via the communications portal, from a plurality of respective bidding teams, a respective acceptance for building and training, by the respective bidding team, a respective model for solving the challenge; receiving, via the communications portal, a respective model submission from a respective bidding team, the model submission being trained without accessing the provider's data set; evaluating, by a programmed processor of the provider's secure computing system, each bidding team's model submission against a common set of metrics; and selecting, by the programmed processor at the provider's secure computing system, a bidding team based on the submitted model evaluation, the bidding team to provide the model for use by the provider to run with a provider's data set.

In a further embodiment, there is provided a system for a secure bidding process for bidding teams. The system comprises: a memory device; a processor connected to the memory device, wherein the processor is configured to: provide, via a communications portal to a provider's secure computing system, a challenge specification requiring a bidding team to create a data science model solution (model) for a provider based on a provider's data set; receive, via the communications portal, from a plurality of respective bidding teams, a respective acceptance for building and training, by the respective bidding team, a respective model for solving the challenge; receive, via the communications portal, a respective model submission from a respective bidding team, the model submission being trained without accessing the provider's data set; evaluate at the provider's secure computing system, each bidding team's model submission against a common set of metrics; and select at the provider's secure computing system, a bidding team based on the submitted model evaluation, the bidding team to provide the model for use by the provider to run with a provider's data set.

In a further aspect, there is provided a computer program product for performing operations. The computer program product includes a storage medium readable by a processing circuit and storing instructions run by the processing circuit for running a method. The method is the same as listed above.

BRIEF DESCRIPTION OF THE DRAWINGS

These and other objects, features and advantages of the present invention will become apparent from the following detailed description of illustrative embodiments thereof, which is to be read in connection with the accompanying drawings, in which:

FIG. 4 shows a flow chart depicting a method for a fair and competitive bidding system implementing the secure hybrid private cloud infrastructure of FIG. 3 in one embodiment.

FIG. 6 depicts an example leaderboard depicting the ranked results of example bidder's as validated against the final data set for an example deep learning challenge in one embodiment;

DETAILED DESCRIPTION

A system and method allowing bidders to develop solutions for an enterprise or organization "task challenge" without directly accessing the organization's data by enabling a model-to-data paradigm. In such an approach, the solver community is able to build/submit executable machine-learned (ML) models or other data science solutions to a secure platform which will then autonomously organize model training and testing in a secure cloud environment and provide feedback on model performance to the bidders (participants). Solvers can use the model performance to improve their algorithms. In this scheme, the proprietary data is secured such that participant bidders cannot download or directly access the actual proprietary challenge data at any point but have a full suite of crowd-sourced challenge tools at their disposal.

Figures 1, 2:
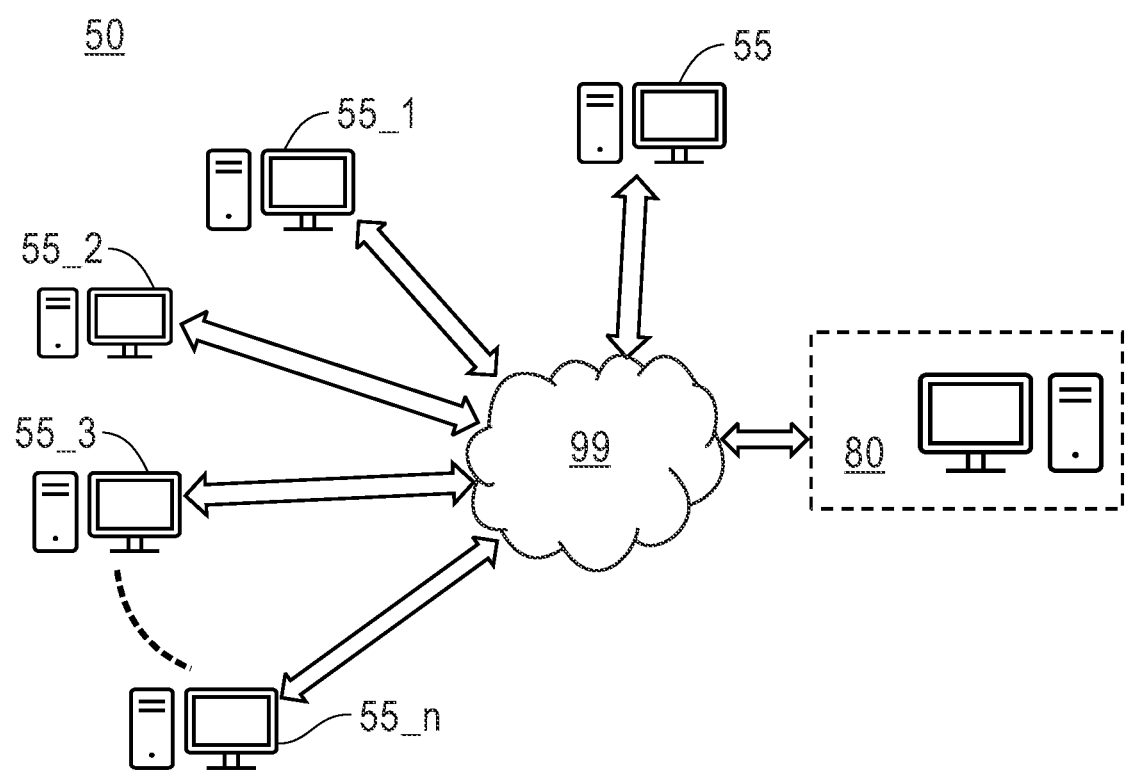
FIG. 1 depicts a conceptual system diagram of a competitive bidding system enabling bidders to select a project or challenge sponsored by a buyer.
FIG. 2 illustrates an exemplary timeline of a task challenge from launch to completion in one embodiment.

FIG. 1 depicts a conceptual system diagram of a competitive bidding system 50 enabling bidders to select a project or challenge sponsored by a buyer ("challenge operation") and build machine learned models for evaluation without accessing the buyer's sensitive data according to an embodiment of the present invention.

FIG. 1 particularly depicts a system containing a plurality of bidder terminals 55, 55_1, 55_2, 55_3 . . . 55_N (a "bidder's terminal") for remotely accessing a secure server or like computing device 80, e.g., via a public or private network 99. Computing device 80 may be a component of a secure computer network owned or operated by an enterprise. An exemplary secure computer network including a hybrid (i.e., public and private) cloud platform 100 will be described in connection with FIG. 3, In particular, as will be described, hybrid cloud platform 100 provides a computing services/infrastructure which can include data storage, networking, access to software and databases, and model analytics. The secure computing device or server 80 can include a model development project, e.g., a "challenge task", provided by a buyer, e.g., a host enterprise or organization, that a bidder can select and participate via the bidder terminal.

In particular, a terminal 55 possessed by a bidder may be a computer or a mobile terminal and may be a terminal which remotely accesses the secure computing device or server 80 through the Internet. In an example, each bidder's terminal 55, 55_1, 55_2 . . . 55_N may access the secure computing device or server 80 through web browsers or exclusive programs and may access the secure computing device or server 80 through a respective access account corresponding to the bidder. In an embodiment, a task challenge is launched via a challenge portal configured to serve as the single one-stop-shop entry point for all bidders (participants) of the challenge.

In embodiments, the secure computing device or server 80 can store information delivered from the bidder's terminal 55, may store results of performing a process according to a request delivered from the bidder's terminal 55, or may provide the results to the bidder's terminal 55.

FIG. 2 depicts an exemplary timeline 72 of a task challenge from launch to completion. A first phase is a competitive phase 72 during which participant bidder or team of bidders submit their models for evaluation on a test validation data set. In an embodiment, participant teams will submit their model code to a hybrid cloud platform which autonomously organizes model training and validation on the raw data and provides back model performance results to the participants. Training and validation sets used during the competitive phase of the challenge follow the model-to-data paradigm while not allowing bidders any direct access to or downloading of any of the data. During this phase, bidders may provide model submissions and iteratively perform training validation and evaluation of their models so that the bidders can optimally revise and refine their model in order to achieve the challenge task specification(s). Then, in an evaluation phase 75 participant bidders or teams of bidders submit their final optimized models, e.g., during a final submission period, for a final evaluation using a final (blind) test data set which had been shielded from bidders at all times. Then, during a final scoring period 78, the system validates all final model submissions using the blind test set data and generates a final score according to one or more defined metrics used to evaluate the model performance. Based on the generated scores, each bidder/model is ranked so that the buyer enterprise can ultimately select a bidder/model that best meets the challenge task criteria.

Figure 3:
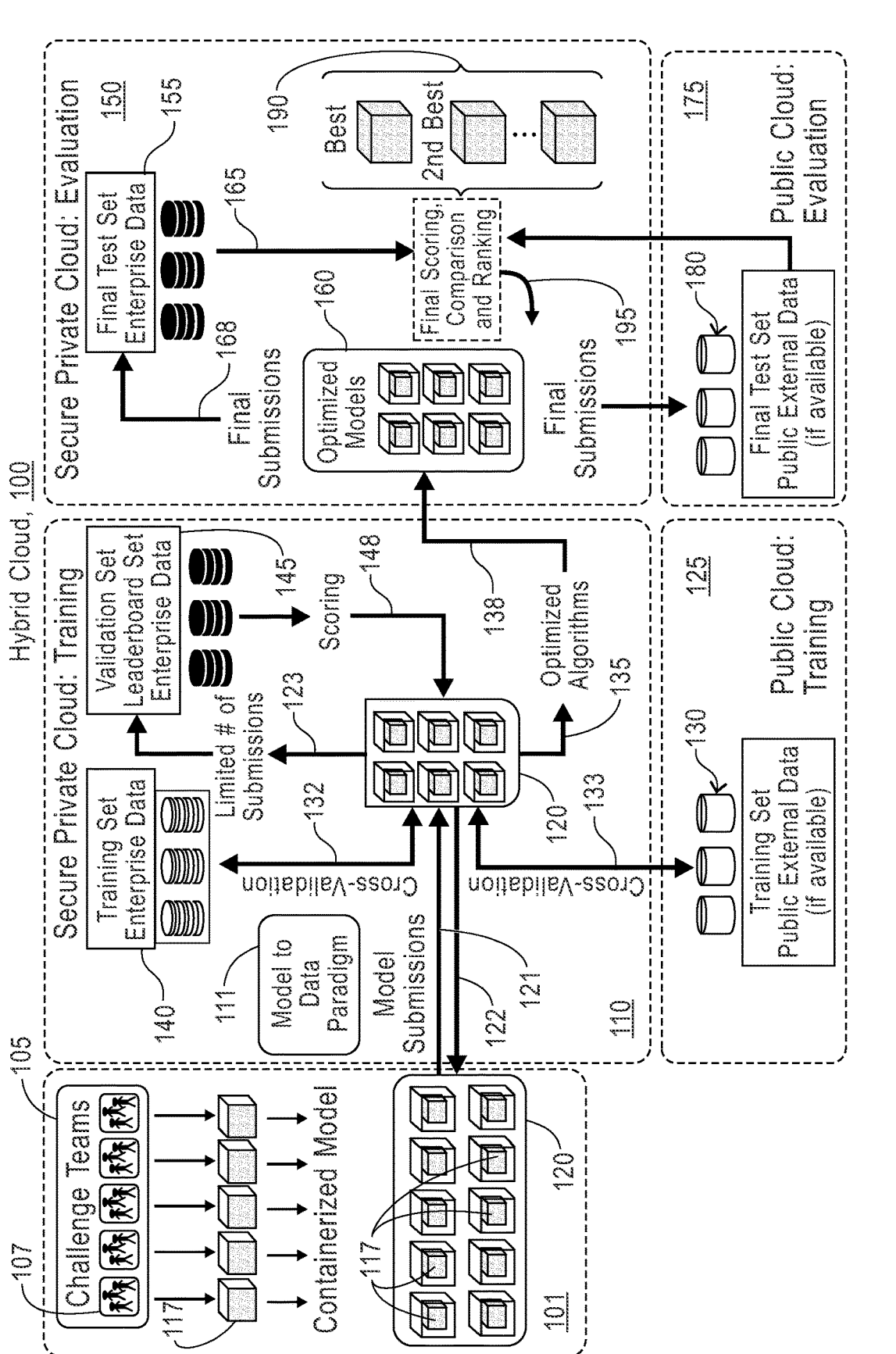
FIG. 3 depicts an example architecture of a secure hybrid cloud computing platform that enables a data and model flow through it during an enterprise's "challenge" operation in one embodiment.

FIG. 3 depicts an example architecture of a hybrid cloud computing platform 100 that enables a data and model flow through it during an enterprise's "challenge" operation ("challenge task"). In an embodiment, FIG. 3 is a secure crowdsourcing platform that brings model to the data. The challenge operation can be for a multi-member, multi-team (e.g., crowdsourced) operation in which bidder/bidding teams bid to perform a certain project for an enterprise without accessing the buyer's sensitive data. While deep learning and machine learning are prime challenge objectives, the architecture is configurable to handle more traditional data science application, e.g., random forests, support vector machines, etc., without accessing the buyer's sensitive data.

The hybrid cloud platform 100 consists of an infrastructure that integrates secure private cloud services including: a secure private cloud 110 implementing a model training service infrastructure providing a run-time environment, e.g., running Tensorflow or PyTorch for use in model training and validation 132 using model training data 140; a corresponding public cloud infrastructure 125 also with training data 130 for model training and model cross-validation 133; a secure private cloud 150 implementing services and a final test dataset 155 used for final model evaluation and model scoring using publicly available data 130; and a corresponding public cloud infrastructure 175 implementing services and a final test dataset 180 for final model evaluation and model scoring. Conceptually depicted in FIG. 3, hybrid cloud platform 100 provides a web portal 101 (e.g., a web-browser font end) that serves as an entry point to challenge task participation, providing access to challenge announcement and information associated with a ML-model build challenge, such as: the type of ML model to be developed for the challenge task, e.g., classification, binary classification, pattern recognition, prediction, regression, neural network, deep learning neural network, etc., timelines and challenge rules, scientific background information, a description of the data used for the challenge, and a small subset of sample data for testing out syntax and sematics. The portal 101 can also facilitate the formation of the challenge teams 107 and provide participants with an intermediate leaderboard of submitted results and a final leaderboard at the end of the challenge.

In an embodiment, via the web portal 101, potential bidders 105 such as one or more bidder teams 107 access a challenge information associated with a model build challenge task. Based on the challenge information, and without disclosing the data used to develop the model, each bidder can build a ML-model that can be "moved" to the data at the secure private cloud infrastructure 110 suitable for training the model to perform the challenge task using data of a secure enterprise training data set 140. In an embodiment, for each bidder, the built models are containerized for submission to the enterprise's secure private cloud where the submitted model is trained with the training data set 140 in the secure computing environment 110. In an embodiment, both enterprise training data set 140, validation data set 145 and final test data set 155 reside beyond a firewall.

With more particularity, as shown in FIG. 3, each challenge team or bidder 107 generates a containerized machine learned model 117 suitable for running on the secure private cloud infrastructure 150. In an embodiment, each bidder team's model is packaged as an application with its relevant environment variables, configuration files, libraries, and software dependencies to build a container image that can then be run on a container platform at the secure private cloud platform 110. While an exemplary use is in the context of Artificial Intelligence (AI) machine learning/deep learning models, the packaging of applications could also apply to other numerical techniques that can be containerized such as support vector machines, random forests, etc.

Each of the containerized models 117 are gathered and the models 120 are submitted 121 during the competitive phase to the secure private cloud platform 110 implementing a model training service run-time environment. In an embodiment, a company's on-premises enterprise data center 140 is transformed into the private cloud infrastructure 110, and that infrastructure 110 is connected to the public cloud environment 125 also implementing a model training service infrastructure for use in model training and/or validation 133. The public cloud environment 125 can be hosted off-premises by a public cloud provide yet can provide public extended data for use in model training and/or validation. The company's on-premises enterprise data can be partitioned to create training, validation and blind test sets which bidding teams could work with only through the secure host platform 110. The hybrid cloud platform of FIG. 3 eliminates the need for bidders to provide their own computing resources and eliminates the need for bidders to download or directly access the challenge data in any way.

Then, once the bidder's submitted model is trained with the training dataset 140 in the secure computing environment 100, the trained model is run at the secure private cloud infrastructure 110 to perform the challenge task with data of a validation (or leaderboard) data set 145. ML-model analytics are applied to evaluate each submitted trained model that is run in the secure computing environment model. When being run, the ML-models are evaluated against several criteria or defined metrics and a model evaluation score 148 is generated for each evaluated ML-model. The results of applying the model to the data and the evaluation results of the analytic runs are fed back to the submitting bidder at 122 for interpretation and use by the bidder to revise or fine-tune their built ML-model within its respective container. In an embodiment, besides the bidding team obtaining feedback on their models final score and ranking, received feedback can additionally include their score on other metadata such as the number of tries and a time to obtaining a solution. The participants could then investigate this feedback in order to better design custom algorithms. This approach is the model-to-data paradigm which keeps data shielded from the solver community while at the same time allowing a crowdsourced approach to model development.

As further shown in FIG. 3, the revised or refined models can then be re-submitted at 121 for training, validation and further evaluation/refinement. After a limited number of such iterations 123, i.e., model submission, model training/validating, model evaluation, and model refinement, re-submission and evaluation, the model becomes optimized at 135 and forwarded at 138 to a secure private cloud infrastructure 150 implementing analytics for a final evaluation according to the defined metrics. The forwarded optimized models 160 are considered finalized. Subsequently, each model container they are wrapped in is unpacked and the finalized model is run by the enterprise using a final test data set 155. Running of the finalized models 168 using a final enterprise data test set 155, or alternatively using a publicly available external final test data set 180, the enterprise can make a final evaluation and use analytics to generate a final score 165 based on the defined metrics. Using the final scores 165 for each finalized model, the enterprise buyer can compare and rank 190 the models and/or rank the bidders according to the defined metrics, and ultimately make a final selection of the best model/bidder for the challenge task. At 195, each bidder/bidding team is made aware of their model's final scores and the buyer's ML-model selection for the challenge task by communicating the bidder's final score and ranking back to the respective bidder.

FIG. 4 shows a flow chart depicting a method 200 for a fair and competitive bidding system implementing the secure hybrid private cloud infrastructure 110. At a first step 205, the buyer (enterprise) publishes a description of the challenge task (project) on the enterprise's secure private cloud infrastructure 110 platform. The potential bidders/bidding teams, through their respective terminals, can access the web-portal and retrieve such challenge task description and subscribe to participate in the challenge. The challenge can include a web-portal providing challenge information, such as timelines and challenge rules, scientific background information, and a description of the data used for the challenge. The portal can also facilitate the formation of teams and provides participants with an intermediate leaderboard of submitted results and a final leaderboard at the end of the challenge.

As a non-limiting, illustrative example, potential bidders can read a challenge task to develop a ML-model, e.g., to recognize an object from imaging data, speech, text, geo spatial information, etc., determine or recognize a pattern from time series data or text, label an image from an image scan, predict a data trend, etc., In one example, a challenge task can be to develop a model for automating a process of labeling images. Such an example challenge, referred to as a "Deep Learning Epilepsy Detection Challenge", can include a task to generate an automatic labelling system to reduce the time a clinician would need to diagnose patients with a particular condition or illness, e.g., epilepsy. This task may encompass the bidding participants to develop deep learning models for automatic annotation of epileptic seizure signals in raw EEG data with maximum sensitivity and minimum false alarm rates. Such task will then include generating a machine learning (ML)-based automatic EEG annotation system that can include a deep-learning model that can learn to automatically recognize different seizure patterns for individual patients based on raw EEG data which allows to calibrate these detection algorithms to patient-specific disease expressions. The challenge task description can include example model parameters that can be used to empower a challenge team to build the model. Such model example parameters can include but are not limited to: data type (imaging, time series, multi-modal), data sizes, labels or signal types that are to be detected or predicted, sample images with labels, etc., without providing direct access to the actual proprietary enterprise data.

Then, continuing to 210, FIG. 4, the bidder(s) or bidding team(s) read the challenge and agree or sign-up to the challenge through the web-portal, and the buyer enterprise can accept the bidders' participation in the challenge. In embodiments, access can be selective and can include both "in-house" analysts or specified groups internal to the enterprise, or external develop communities (challenge teams). Subsequently, during the competitive phase, the bidder challenge teams develop the machine learned model given the model parameters and specifications for the challenge task.

As shown in FIG. 3, in one embodiment, the model to data paradigm implements a container environment or infrastructure 111 within the secure private cloud model training infrastructure 110. Such a containerized environment is a cloud platform providing the building blocks including a container that allows bidders' calculations to be run in a portable way on the appropriate components of the hybrid cloud infrastructure 100 without concerns of software and hardware compatibility and that have different security and access restrictions. The container will contain the access information, contain the safeguarding components (e.g., encryption, firewall, etc.) and include instructions for the recipient of the container data contents such as what it is and what to do with the model. Such instructions in the container will enable a recipient to apply the model to the proprietary data set or provide certain evaluation results and information in the container that will empower the bidder team to refine the model or develop another model.

As an example, instructions in the model code (e.g., source code or executable) submitted by the bidder for evaluation by the buyer includes the Tensorflow or PyTorch classes for defining and initializing a deep neural network, and classes and libraries for: 1) loading data; and 2) specifying how data will pass through the bidder's model. As an example, for a challenge task to recognize images, code representing a convolution model can be defined and initialized where the model adds each element of an image to its local neighbors, e.g., weighted by a kernel, or a small matrix, that helps extract certain features (e.g., edge detection, sharpness, blurriness, etc.) from the input image. Such a convolution model can include defining a first class (e.g., "net") defining a first 2D convolutional layer for taking in an input channel (image) and outputting a first number f convolution features with a square kernel size. A second 2D convolutional layer can take in the first number of input layers and output a further number of convolutional features (using a same square kernel size); and defining dropout layers of adjacent pixel activity, e.g., with a defined input probability, defining a first fully connected layer and a second fully connected layer to output labels.

The code for this model submission can further define functionality to pass data into the neural network represented as a feed-forward algorithm, e.g., passing the data through the first 2D convolutional layer, using a rectified-linear activation function over the data, run a max pooling over the data, pass the data through the dropout, flatten the data, applying a softmax function, etc.

Once this example model code is generated, it is containerized for submission to the secure private cloud for training and evaluation.

That is, at 215, FIG. 4, based upon the model parameters and challenge task specifications, each bidder generates an untrained model and places the (untrained) executable ML model application and related components into a container for submission to the secure platform 110 for training and testing. In an embodiment, each bidder uses a container such as the open source Docker container that packages the executable model application with all of its dependencies into a standardized unit or image. This step includes wrapping the developed machine model software in a complete filesystem that includes everything the model needs to run: code, runtime, system tools, system libraries, etc., Further exemplary container environments implementable for deploying and executing the complete file system for running the developed model between the components of the hybrid cloud infrastructure include the Singularity and OpenShift container platforms.

In an embodiment, the buyer can provide for each bidder a container structure, e.g., a Dockerfile template indicating the model parameter information (e.g., metadata) indicating the data modality or type of data (e.g., imaging data, time series data, multi-modal data) and the data size or how much data the ML-model is required to be analyzed and including the signal type in the data or labels that the analytic model is to detect, predict or label (e.g., a cancer tumor in mammography scan imaging data set). Further provided are instructions as to how the data is to be processed and can include any sample data (e.g., image scans that contain tumors or do not contain tumors or patterns of data) or data formats. Additionally included in the Dockerfile template are specifications of the mechanical locations, i.e., file names of where to find/read required data inputs and file-names (locations) for where to put/write required output data. The template will name all file directories and will be filled in with other information pertaining to the submitting team, e.g., meta-information with details of the submitting team, e.g., names, contact information, etc. so the system can keep track of the bidding team models. This is packaged with executable instructions as to what is needed to be analyzed with instructions as to the type of model that needs to be developed, and/or what algorithms or model structures are needed for inclusion in the model application. In response, the hybrid cloud system creates a virtual environment including a virtual file system in the hybrid network that can be processed with the bidding team name or identifier so that each teams' results can remain independent and the bidding team's metadata, meta-information and evaluation results can be found.

In an embodiment, the enterprise hosting the challenge task can provide bidders access to any computing system resource for the model development without the bidder accessing any proprietary data sets. In a non-limiting, example implementation, the cloud infrastructure 110 of FIG. 3 can include a platform providing access to resources such as IBM's Watson® Studio (trademark of International Business Machines Corp.) that provide a number of services accessible to in-house and external challenge teams. For example, a bidder can create a user account through the web portal 101, and upon user account creation the bidder can access a further platform which hosts a further user interface and starter kit and forms a main component for designing and testing models 120 during the challenge. In non-limiting embodiment, the IBM Watson® Studio platform provides the run-time environment for the bidding teams, e.g., the advanced analytics capabilities for data scientists to write code for ML/Deep learning and allows for real-time collaboration on shared notebooks between team members. In a non-limiting, exemplary implementation, a "starter kit" in the form of Jupyter notebooks, supporting deep learning libraries, e.g., TensorFLow and PyTorch, can be provided to all challenge teams to guide them through the challenge process, e.g., by specifying what commands to run, how to add the bidder's code to the container, etc. Upon instantiation, the starter kit loads any necessary python libraries and custom functions into the container for integration with a cloud storage environment that securely stores the private enterprise training data set 140, validation data set 140, and final test data set 155. In a non-limiting, exemplary embodiment, the container can further integrate with an analytics engine, e.g., IBM's Watson® Machine learning platform or any other closed or open source machine learning platform. The private cloud infrastructure 110 can include access to a machine learning platform enabling participants to develop custom pre-processing code (including custom montages), machine learning models, and post-processing algorithms. Either via the starter kit, or by direct messaging to the bidding team via designated contact, the secure hybrid cloud 110, 150 provides instant feedback about participants' custom routines, e.g., through data visualizations. Using the notebook only, teams are able to run their code on the machine learning platform, making use of a compute cluster of resources. The starter kit can also enable submission of the final code to a specified data storage location to which only the challenge team has access. In an embodiment, the open-source or closed-source machine learning platform provides access to shared compute resources (e.g., Graphics Processing Units, GPUs) and in a non-limiting embodiment, the bidding team's submitted code can be bundled automatically into the starter kit and deployed on the machine learning platform. The machine learning platform in turn has access to shared storage from which it requests recorded data and to which it stored the participant's code and trained models. This same functionality can be employed in an entirely open-source competitive bidding system implementation.

In an embodiment, at 215, FIG. 4, based on the provided challenge task specifications/instructions, the bidder generates or builds the model, e.g., within the hybrid cloud execution platform. The built model can include: 1) a first component indicating how to prepare the buyer's data, e.g., prepare, select, filter, curate, format or cleanse the proprietary training and validating data for use in the model, and 2) a second component, the actual model algorithm/code, such as Python language commands, as to what to do with the prepared data without the bidder directly accessing the buyer's data. These built data specification and model code are input into a Dockerfile from which a container image is created. In an embodiment, the Dockerfile includes a text file describing all the commands (e.g., FROM, PULL, RUN, CMD) a user could run on the command line to create an image and each bidding team will submit such a file to create an image to build a container specifying file locations, meta-information, and use of these first and second components to be run. The Docker image includes a series of filesystem layers representing instructions in the image's Dockerfile that makes up an executable software application (executable code). In an embodiment, a YAML data serialization language is used to compose the dockerfiles and to specify tasks to be executed therein. The YAML file can be used to specify the configuration code such as image name, container name, host port and container, run time and environment variables, etc. Then, at 220, the Dockerfile image including the bidder's executable model application is submitted to the enterprise's secure private cloud training platform infrastructure 110, e.g., hybrid cloud execution platform 100, where the model algorithm is unpacked and trained at 225 to perform the challenge task in the run-time environment, e.g., implementing TensorFLow or PyTorch machine learning environment, based on the proprietary training data set 140 at a specified location inaccessible to the bidder team.

Then, in FIG. 3 at 230, within hybrid cloud execution platform, the bidder's analytical model is evaluated using the validation data set 145 which can be the same set used for validating each respective bidding team's model being evaluated, and evaluation results including a produced score that can be presented to an intermediate leaderboard. These scoring results can then be provided back to the respective bidders outside the secure platform via the container. In the case of the example "Deep Learning Epilepsy Detection Challenge", the evaluating of the trained seizure detection models is scored according to a defined metric including a maximum percent (%) detection sensitivity at a minimum false alarm (FA) rate. In one embodiment, an evaluation metric "E" for scoring a trained seizure detection model is defined according to:

$$E = (FA/S) - \varepsilon * S$$

where FA is a false alarm rate (e.g., per 24 hours), S is the detection sensitivity and $\varepsilon$ is a positive constant. This formula constitutes the pre-defined objective function for measuring success and remains unchanged during the course of the challenge. A best solution will have the smallest "E" value.

However, in embodiments, depending upon the model being developed for the challenge task, other criteria or metrics to be used in the model evaluation can include, but is not limited to one or more of: model output response time, number and rate of attempts to solve the analytics, quality of the results (e.g., accuracy for detecting a pattern or a tumor in an image), code compactness, model complexity (e.g., slim model vs. a super deep neural network), competitive team size, power consumption of the model, etc. In response to the evaluation results of the evaluated model according to the applied metric(s), a score(s) or value (e.g., a percentage, a time value from data ingestion to data detection or decision, a value of the power consumption, accuracy) can be generated for each metric and these evaluation scores are sent back to the respective bidder via that bidder's container.

In response to receiving the evaluation result scores, during the competitive phase, each bidder can then refine, adjust, adapt and/or calibrate their model algorithm. For example, a bidder team is notified via a score that their model consumes excessive power, they can refine the model by reducing an amount of nodes or layers (the model needs to be slimmed down); or alternatively, for example, if the accuracy score indicates a need for image detection improvement, the bidder team in response may re-format the data or use another algorithm.

In an embodiment, during the competitive phase, the enterprise can allow for several iterations of model test training, evaluation and model refinement, e.g., to guard against reverse engineering of the validation data set. Thus, in FIG. 4 at 240, a determination is made as to whether a last iteration of model test training and validation has been made. If the last iteration has not been made, the process returns to step 215 in order to repeat steps 215-230 in order to further modify and/or fine tune the analytical model/model algorithm without directly accessing the buyer's data. Otherwise, at 240, if it is determined that the last iteration of model test training, evaluation and model refinement has been performed, then the bidder's model/model algorithm is considered optimized and finalized, and the optimized model is sent to the secure private cloud evaluation platform infrastructure 150 for a final evaluation using a different final data set. Then, at 250, the method proceeds to finally evaluate each of the bidder teams' final optimized model using the final test data set 155. In an embodiment, the system extracts the pre-processing model and post-processing code from each bidder submission and runs these models on a held-out blind test dataset (to which participants had not had access to at any point during the challenge). Using the run-time environment, the private cloud evaluation platform infrastructure 150 runs each bidder's model against the same defined metrics. For the example case of the "Deep Learning Epilepsy Detection Challenge", the evaluating of the trained seizure detection models is according to the function "E"

incorporating such criteria including the maximum percent % detection sensitivity at a minimum false alarm rate.

Figure 5:
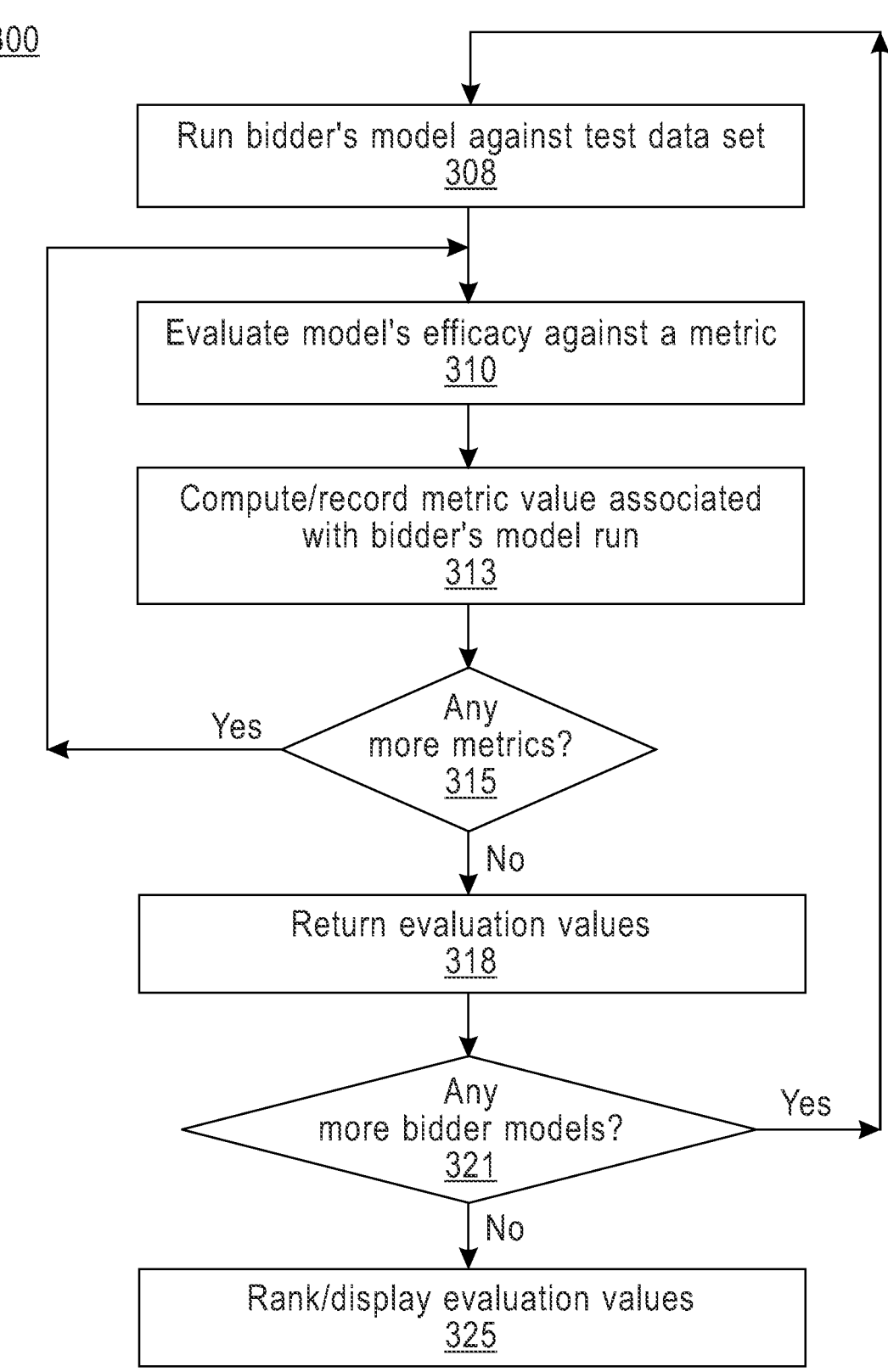
FIG. 5 illustrates an example method for model evaluation at the secure evaluation platform infrastructure.

Corresponding to the evaluating method steps 230, 250 of FIG. 4, a method for model evaluation at the secure evaluation platform infrastructure 150 is depicted as method 300 shown in FIG. 5. A first step 308 in the method 300 of FIG. 5 includes loading the bidder's model container, finding the proprietary data set at a specified data storage location specified in the template, deploying the executable code of the bidder's model in a pre-built binary environment, and running the bidder's model using a validation data set or a final (blind) data set (should the built model be optimized or finalized after several training/validating iterations). For a first bidder, at 310, during or after the model run using the new data, the model's efficacy is evaluated against one or more metrics. Such a metric(s) can include, but is not limited to: a developmental efficiency metric such as model output response time, number and rate of attempts to solve the analytics, quality of the results, classification accuracy, code compactness, competitive team size, use of energy, etc.

In an embodiment, an evaluation function is invoked to generate the various model evaluation metrics for the model being evaluated using a validation data set. For an embodiment of a classification model, such evaluation function can generate such further classification metrics including but not limited to: 1) Accuracy, e.g., the proportion of correctly identified instances out of all identified instances; 2) Error rate, e.g., the proportion of incorrectly identified instances out of all identified instances; 3) Sensitivity, also known as the true positive rate (TPR), i.e., the probability of getting a true positive; 4) Specificity, also known as the true negative rate (TNR), i.e., the probability of getting a true negative, whereby both sensitivity and specificity capture the confidence with which a model makes predictions; 5) Recall is the same as sensitivity: the proportion of correctly classified retrieved documents out of the set of all documents belonging to a class of interest; 6) Precision is the proportion of correctly classified retrieved documents out of the set of all retrieved documents; 7) F-score, is a single measure including a harmonic mean between both precision and recall; and 8) a confusion matrix or a contingency table, is a cross-tabulation that shows a summary of the predicted class values against the actual class values. Columns in a confusion matrix contain the number of instances belonging to the predicted classes, and rows contain the number of instances belonging to the actual classes.

Then, continuing to 313, FIG. 5, the system computes/records the metric value associated with the bidder's model run and at step 315, a determination is made as to whether there is any more metrics to evaluate. If there is more metrics, the process returns to 310 in order to repeat running the model to ascertain model efficacy against the next metric and to compute/record the metric value associated with the bidder's model run. As long as there are metrics for evaluation for that bidder's model, the process steps 310-313 are repeated. If at 315, it is determined that there are no more metrics to be evaluated, then the process proceeds to 318 to return all of the efficacy values for that bidder's model in for use in ranking the bidder. These efficacy values are final scores used for purposes of ranking. Then, continuing to 321, a determination is made as to whether there are any more bidder model's to evaluate using a validation data set or a final (blind) data set (should the built model be optimized or finalized after several training/validating iterations). If there are further bidder models to evaluate, the process returns to 308 in order to run the next bidder's model against the test data set, and the process steps 310-318 are repeated for that next bidder's model. These process steps are repeated for as long as there remain bidder models to be evaluated for the participating bidders. If, at 321, FIG. 5, it is determined that no bidder models remain to be evaluated, then the process proceeds to 325 in order to rank evaluation score results and display the ranked model evaluation score results and then the process ends.

Finally, returning to FIG. 4, at 255, based on the returned evaluation results, the system ranks the bidders against the set of evaluation metrics at enterprise's secure private cloud evaluation platform infrastructure 150. Then, at FIG. 4, 260, the enterprise's secure private cloud evaluation platform infrastructure 150 can return the evaluation results to the buyer (enterprise) hosting the challenge. In particular, the buyer receives the ranked list of each bidder's model against each defined metric. In an embodiment, a leaderboard which ranks the bidders against the different metrics will be automatically generated and updated by each submission and optionally presented to the buyer.

FIG. 6 depicts an example leaderboard 400 depicting the ranked results of example bidder's as validated against the final data set for the example "Deep Learning Epilepsy Detection Challenge". For example, leaderboard display 400 shows a first column 403 having respective rows 402 indicating a respective ranked bidding team and indicating each bidding team's respective generated evaluation score in column 406. Given the "Time-Aligned Event Scoring" (TAES) metric used as the evaluation framework that is designed to score high-resolution automatic EEG annotation algorithms, e.g., for use by clinical neurologists as assistive labelling systems for raw EEG monitoring data, the model scoring metrics that were indicated for the machine learning based automatic seizure detection models applied to the challenge dataset were a maximum threshold percent % sensitivity for clinical applicability of an automatic seizure detection system at a minimum false alarm rate. The model ranking is thus based upon two metrics: the detection sensitivity with respective model evaluation sensitivity values shown in column 409 and the detection FA/24 hours with respective model evaluation false alarm rate values shown in column 412. A final column 415 can include other values (not shown) based upon a further evaluation metric, e.g., the time to generate a model output.

EXAMPLE IMPLEMENTATION

In an example, there are provided solutions developed by challenge participants and used for generating the results reported for the example "Deep Learning Epilepsy Detection Challenge". In particular, for example models developed for the challenge, there is explained (i) how data was pre-processed, (ii) the architecture of the deep learning model and how parameters were chosen, as well as (iii) how the model was trained.

Example 1

A first submitted model provides the code to pre-process data by extracting a small interval of EEG data, with each data interval comprising a matrix with a pre-defined shape. This EEG data with true labeling is oversampled by a predetermined factor. This EEG data is then transformed into a matrix with another shape to yield a 3D data. The output of the transformation contains a number of time-series data field each of which consists of a number of seconds of data samples. Then, the submitted code provides instructions to apply an FFT to the EEG data resulting in a new matrix of a further shape.

The model architecture of this first example submission includes the specification/use of a convolution neural network and hyperparameters. The processes include operation for performing a 2D convolution, 2D MaxPooling, Dropout, Flatten, Dense using specified hyperparameter values including Kernel_size, strides, pool_size, etc. A trained model including dense neural networks are then applied to merging the data encodings and a final layer includes applying an activation (e.g., sigmoid) to generate an output label.

For this first model, a post-processing procedure includes taking an average of the output of the trained model. The prediction value of time T is calculated as an average in a time interval and true or false is decided for each one second time interval based on the average value calculated by using a threshold value.

Example 2

A second submitted model provides the code to pre-process an entire EEG dataset by incorporating temporal sequence modelling with Recurrent Neural Networks such that the data becomes restructured with a predetermined window size of seconds providing a new input shape.

A detailed model architecture for this example second submission includes the production/use of an Encoder-Decoder with Attention (CNN encoder+GRU decoder+temporal and channel attention weights). Time Distributed 2D Convolution layers are used to encode features across channels. These encoded features are then input as a sequence across time steps to a GRU layer. Multiplicative sequence attention weights are then learnt on the output sequence from the GRU layer. A 1 D Convolution layer is used followed by multiple Dense layers to finally output a probability for the 2 classes (1/0). Kernel regularizers and Dropout are used across each of the layers to reduce overfitting. Then, Elu, Relu, and Softmax activation functions are used. An Adam optimizer is used with clipNorm to avoid exploding gradients. The loss function is categorical cross entropy and the accuracy metric is recall.

Model training and hyperparameters are specified as functions to prepare batches of training data with shuffling and stratification to balance the skewed class of positive samples. A validation data accuracy is used for model evaluation. Hyperparameter values include: a Number of Epochs, a Batch Size, a Learning rate, a Dropout value, an L2 regularizer value, a decay value, an Epsilon, etc.

For this second model, a post-processing procedure is used to reduce the false alarms. Two parameters are used including: Weighted moving average window and probability threshold. The Weighted moving average is used for smoothing to disallow sudden spikes of false alarms. The Probability threshold is used to balance precision and recall as per the business requirements. The validation dataset is used to grid search the combinations of window size and probability threshold that produces the best evaluation metric as defined in the challenge criteria.

Example 3

A third submitted model provides the code to pre-process EEG dataset by extracting predetermined intervals of EEG data. This EEG data is transformed for subtracting min value and apply log 1p. Each data interval is represented by a matrix with pre-defined shape. Each data interval consists of the initial state with a shape and the target state with another shape. The initial state interval consists of the first 10 s of every raw EEG data trace. Target states are repeating 60 s intervals except for the initial state. For EEG data with a duration of less than 70 s: the EEG data is complemented with first 5 s of EEG data up to 70 s. For EEG data with a duration of 70 s or longer: the EEG data is divided into first 10 s and rest. The first 10 s is defined as the initial state. Then, complement EEG data with first 5 s of the initial state, then partition into 60 s segment except for the first 10 s. The complemented interval is treated as non-seizure. This processing creates 3 labels: a first label defined as true label if seizure intervals of middle 10 s of the target state make up more than $\frac{1}{3}$; a second label defined as true label if seizure intervals of middle 30 s of the target state make up more than $\frac{1}{3}$; and a third label defined as true label if seizure intervals of the target state make up more than $\frac{1}{3}$. To enable downsampling, there is stored false intervals for up to 5 records of the same EEG data trace.

A detailed model architecture for this third submission includes the specification/use of a convolution neural network and hyperparameters. The processes include operations for Reshaping, 2D convolution, 2D MaxPooling, a 1D convolution, a Flatten, a Global Average Pooling to detect a seizure or no seizure (as an output) within a 10 second, 30 second or 60 second interval. Specified hyperparameter values including shape, Kernel_size, strides, pool_size, etc. A trained model including dense neural networks are then applied to merging the data encodings and apply an activation (e.g., sigmoid) to generate an output label.

Example 4

A fourth submitted model provided no pre-processing augmentation. However, the code included instructions for balancing classes at pre-processing stage in order to save compute time on the initial runs of the full dataset. A final dense layer with an output of two classes is provided.

A detailed model architecture for this further submission includes the specification/use of three stacked GRUs of decreasing sizes followed by two convolution layers. This result is flattened and fed to the last layer.

In an embodiment, each bidder submits their "entries", i.e., the information submitted in the manner and format specified on the particular challenge website during the challenge period. Such submissions can include code (source code or executable) for evaluation. Each bidder entry is uploaded to the hybrid cloud platform in the manner and format specified in the challenge instructions, e.g., via a container. For leaderboard scoring, each bidder team can be permitted to submit up to a maximum number of entries (to be determined individually for each challenge).

Figure 7:
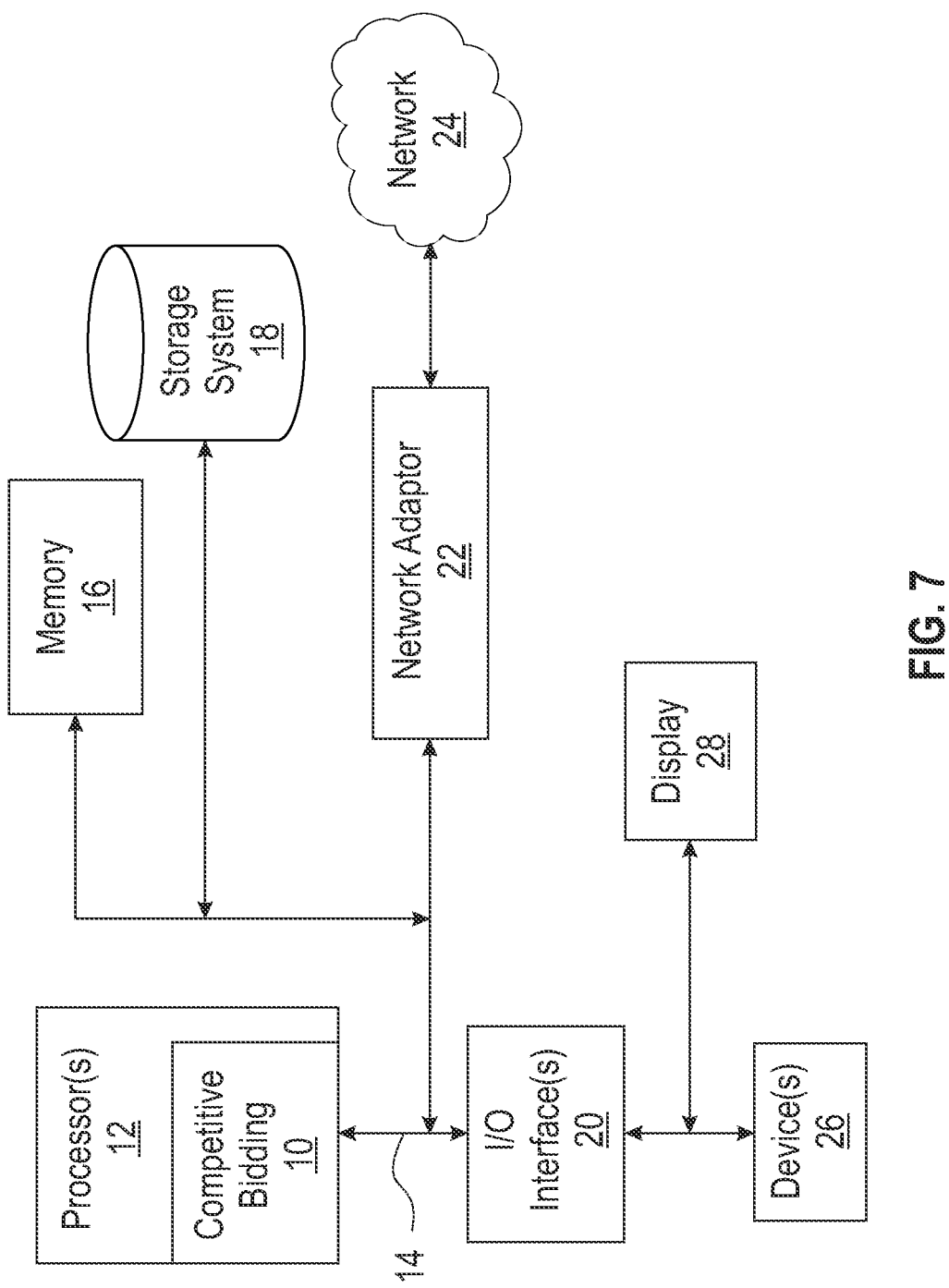
FIG. 7 illustrates a schematic of an example computer or processing system that may implement the competitive bidding system framework in the embodiments of the present disclosure.

FIG. 7 illustrates a schematic of an example computer or processing system that may implement the secure and fair bidding system in which bidders do not directly access the offering organization's data but can develop analytics on the organizations' real data and submit to the offering organization to be evaluated against other bidding teams in the embodiments of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the fair and competitive bidding system methods described herein. The competitive bidding system module 10 having instructions employing the methods herein may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, and external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising." when used in this specification, specify the presence of stated features, integers, steps, operations, elements, and/or components, but do not preclude the presence or addition of one or more other features, integers, steps, operations, elements, components, and/or groups thereof.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows: On-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows: Software as a Service (Saas): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls). Deployment Models are as follows: Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises. Public cloud: the cloud infrastructure is made available to the general public or a large industry group and is owned by an organization selling cloud services. Hybrid cloud: the cloud infrastructure is a composition of two or more clouds (private, community, or public) that remain unique entities but are bound together by standardized or proprietary technology that enables data and application portability (e.g., cloud bursting for load-balancing between clouds). A cloud computing environment is service oriented with a focus on statelessness, low coupling, modularity, and semantic interoperability. At the heart of cloud computing is an infrastructure that includes a network of interconnected nodes.

Figure 8:
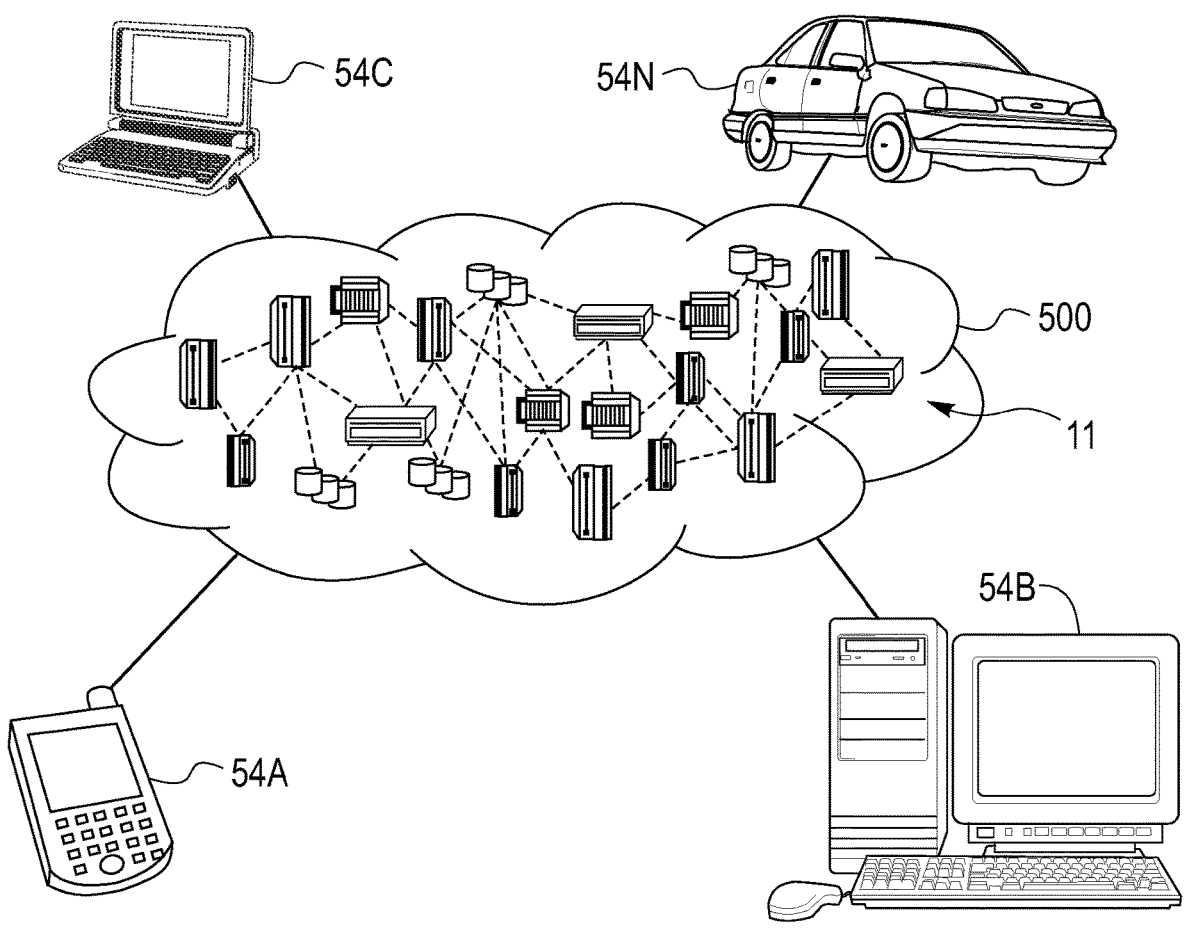
FIG. 8 depicts a cloud computing environment according to an embodiment of the present invention.

Referring now to FIG. 8, illustrative cloud computing environment 500 is depicted. As shown, cloud computing environment 500 includes one or more cloud computing nodes 11 with which local computing devices used by cloud consumers, such as, for example, personal digital assistant (PDA) or cellular telephone 54A, desktop computer 54B, laptop computer 54C, and/or automobile computer system 54N may communicate. Nodes 11 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 11 and cloud computing environment 500 can communicate with any type of computerized device over any type of network and/or network addressable connection (e.g., using a web browser).

Figure 9:
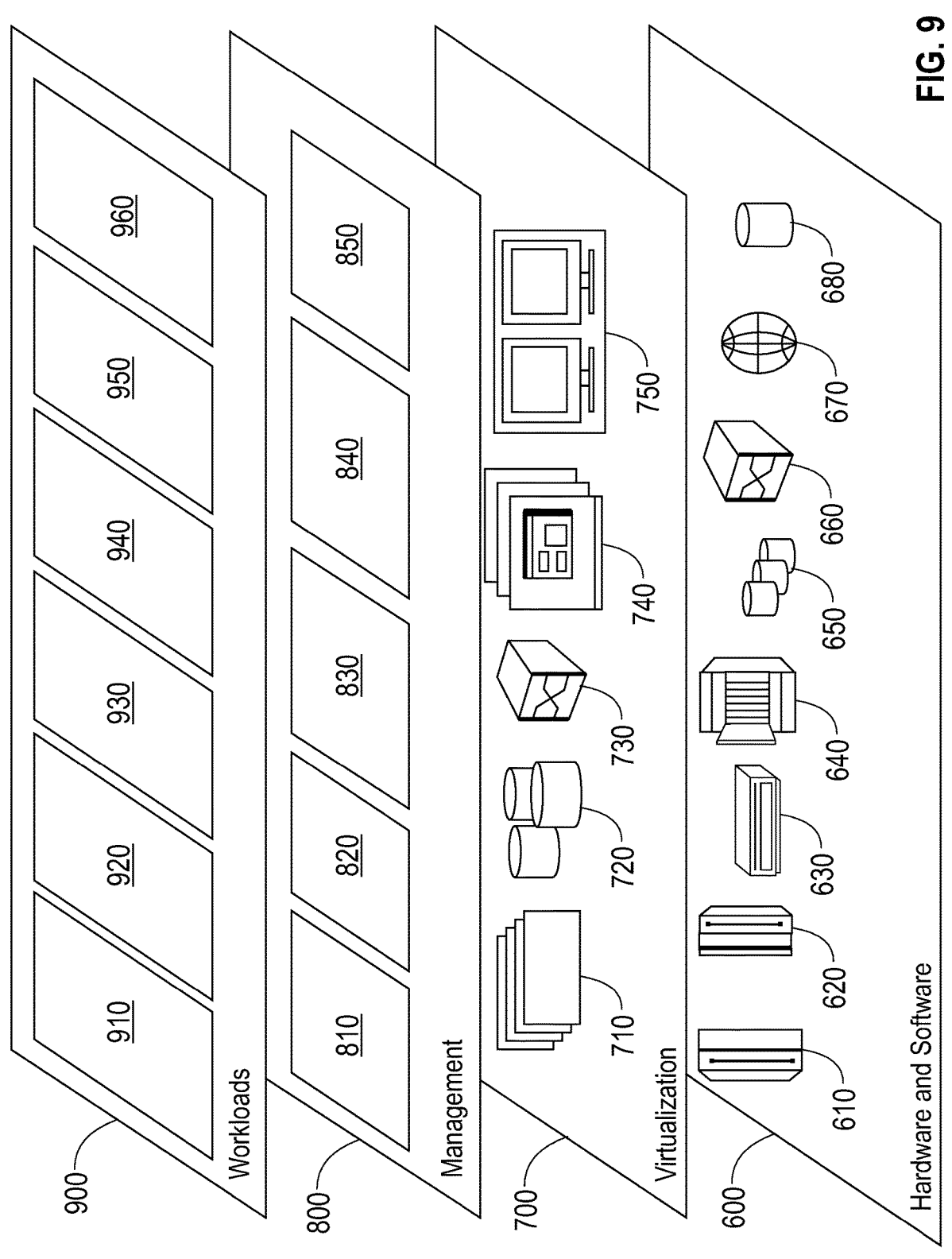
FIG. 9 depicts abstraction model layers according to an embodiment of the present invention.

Referring now to FIG. 9, a set of functional abstraction layers provided by cloud computing environment 51 (FIG. 8) is shown. It should be understood in advance that the components, layers, and functions shown in FIG. 9 are intended to be illustrative only and embodiments of the invention are not limited thereto. As depicted, the following layers and corresponding functions are provided: Hardware and software layer 600 includes hardware and software components. Examples of hardware components include: mainframes 610; RISC (Reduced Instruction Set Computer) architecture based servers 620; servers 630; blade servers 640; storage devices 650; and networks and networking components 660. In some embodiments, software components include network application server software 670 and database software 680. Virtualization layer 700 provides an abstraction layer from which the following examples of virtual entities may be provided: virtual servers 710; virtual storage 720; virtual networks 730, including virtual private networks; virtual applications and operating systems 740; and virtual clients 750. In one example, management layer 800 may provide the functions described below. Resource provisioning 810 provides dynamic procurement of computing resources and other resources that are utilized to perform tasks within the cloud computing environment. Metering and Pricing 820 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 830 provides access to the cloud computing environment for consumers and system administrators. Service level management 840 provides cloud computing resource allocation and management such that required service levels are met. Service Level Agreement (SLA) planning and fulfillment 850 provide pre-arrangement for, and procurement of, cloud computing resources for which a future requirement is anticipated in accordance with an SLA. Workloads layer 900 provides examples of functionality for which the cloud computing environment may be utilized. Examples of workloads and functions which may be provided from this layer include: mapping and navigation 910; software development and lifecycle management 920; virtual classroom education delivery 930; data analytics processing 940; transaction processing 950; and a secure and fair competitive bidding processing 960 that allows bidders to develop solutions for an organization without directly accessing the organization's data.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for a secure bidding process for bidding teams, the method comprising:

providing, via a communications portal to a provider's secure computing system, a challenge task specification requiring a bidding team to create a data science model solution (model) for a provider based on a provider's data set, said provider's dataset being stored in a secure storage system residing behind a firewall and prevented from direct access by said bidding team, and the challenge task specification comprising metadata indicating a type of data or data modality, labels or signal types that are to be detected or predicted, an amount or size of the data the bidding team's model is required to analyze and sample data representative of the data type, the metadata communicated to each bidding team via a template provided in a software container structure;

receiving, via the communications portal, from a plurality of respective bidding teams, a respective acceptance for building and training, by the respective bidding team, a respective model for solving said challenge task;

receiving, via said communications portal, a respective model built based on the metadata of said challenge task specification and submitted from a respective bidding team, said model submission being trained without remotely accessing said provider's data set;

evaluating, by a programmed processor of said provider's secure computing system, each bidding team's model submission against a common set of metrics;

selecting, by the programmed processor at the provider's secure computing system, a bidding team based on said submitted model evaluation, said bidding team to provide said model for use by said provider to run with a provider's data set, wherein said model and additional objects for specifying a data flow through said model for training said model are wrapped inside the software container structure for communication over said communications portal, and said receiving said respective model submission comprising:

unpacking, at said computer system, said wrapped container structure to enable a training and evaluation of said model by said programmed processor at said secure computing system.

2. The method as claimed in claim 1, wherein a bidding team builds the model in a provider's secure network system.

3. The method as claimed in claim 1, wherein the common set of metrics used for evaluating a bidder's submitted model comprises one or more selected from: a response time, a number and rate of attempts to solve the analytics, a model accuracy, an amount of energy used to obtain a result, a quality of code, a quality of a result, a compactness of developed code, and a team size.

4. The method as claimed in claim 3, further comprising:

configuring said programmed processor as a leaderboard, said leaderboard automatically performing a ranking of said bidder team against each other team using said common set of metrics; and automatically updating said leaderboard by each submission and presenting said bidder team ranking to the provider.

5. The method as claimed in claim 1, wherein a bidding team's model submission comprises:

a specification defining and initializing a machine-learned model including any input data pre-processing and hyperparameter values for training said model; and a specification further comprising a flow of said input data through said defined and initialized machine-learned model including any post-processing of a model output data.

6. A system for a secure bidding process for bidding teams, the system comprising:

a memory device;

a processor connected to the memory device, wherein the processor is configured to:

provide, via a communications portal to a provider's secure computing system, a challenge task specification requiring a bidding team to create a data science model solution (model) for a provider based on a provider's data set, said provider's dataset being stored in a secure storage system residing behind a firewall and prevented from direct access by said bidding team, and the challenge task specification comprising metadata indicating a type of data or data modality, labels or signal types that are to be detected or predicted, an amount or size of the data the bidding team's model is required to analyze and sample data representative of the data type, the metadata communicated to each bidding team via a template provided in a software container structure;

receive, via the communications portal, from a plurality of respective bidding teams, a respective acceptance for building and training, by the respective bidding team, a respective model for solving said challenge task;

receive, via said communications portal, a respective model built based on the metadata of said challenge task specification and submitted from a respective bidding team, said model submission being trained without remotely accessing said provider's data set;

evaluate at said provider's secure computing system, each bidding team's model submission against a common set of metrics;

select at the provider's secure computing system, a bidding team based on said submitted model evaluation, said bidding team to provide said model for use by said provider to run with a provider's data set, wherein said model and additional objects for specifying a data flow through said model for training said model are wrapped inside the software container structure for communication over said communications portal, and said receiving said respective model submission comprising:

unpacking, at said computer system, said wrapped container structure to enable a training and evaluation of said model by said programmed processor at said secure computing system.

7. The system as claimed in claim 6, wherein a bidding team builds the model in a provider's secure network system.

8. The system as claimed in claim 6, wherein the common set of metrics used for evaluating a bidder's submitted model comprises one or more selected from: a response time, a number and rate of attempts to solve the analytics, a model accuracy, an amount of energy used to obtain a result, a quality of code, a quality of a result, a compactness of developed code, and a team size.

9. The system as claimed in claim 8, wherein said processor is configured as a leaderboard for leaderboard automatically performing a ranking of said bidder team against each other team using said common set of metrics; and automatically updating said leaderboard by each submission and presenting said bidder team ranking to the provider.

10. The system as claimed in claim 6, wherein a bidding team's model submission comprises:

a specification defining and initializing a machine-learned model including any input data pre-processing and hyperparameter values for training said model; and a specification further comprising a flow of said input data through said defined and initialized machine-learned model including any post-processing of a model output data.

11. A computer program product for a secure bidding process for bidding teams, the computer program product comprising a computer readable storage medium, the computer readable storage medium excluding a propagating signal, the computer readable storage medium readable by a processing circuit and storing instructions run by the processing circuit for performing a method, said method steps comprising:

providing, via a communications portal to a provider's secure computing system, a challenge task specification requiring a bidding team to create a data science model solution (model) for a provider based on a provider's data set, said provider's dataset being stored in a secure storage system residing behind a firewall and prevented from direct access by said bidding team, and the challenge task specification comprising metadata indicating a type of data or data modality, labels or signal types that are to be detected or predicted, an amount or size of the data the bidding team's model is required to analyze and sample data representative of the data type, the metadata communicated to each bidding team via a template provided in a software container structure;

receiving, via the communications portal, from a plurality of respective bidding teams, a respective acceptance for building and training, by the respective bidding team, a respective model for solving said challenge task;

receiving, via said communications portal, a respective model built based on the metadata of said challenge task specification and submitted from a respective bidding team, said model submission being trained without remotely accessing said provider's data set;

evaluating, by a programmed processor of said provider's secure computing system, each bidding team's model submission against a common set of metrics; and selecting, by the programmed processor at the provider's secure computing system, a bidding team based on said submitted model evaluation, said bidding team to provide said model for use by said provider to run with a provider's data set, wherein said model and additional objects for specifying a data flow through said model for training said model are wrapped inside the software container structure for communication over said communications portal, and said receiving said respective model submission comprising:

unpacking, at said computer system, said wrapped container structure to enable a training and evaluation of said model by said programmed processor at said secure computing system.

12. The computer program product as claimed in claim 11, wherein a bidding team building the model in a provider's secure network system.

13. The computer program product as claimed in claim 11, wherein the common set of metrics used for evaluating a bidder's submitted model comprises one or more selected from: a response time, a number and rate of attempts to solve the analytics, a model accuracy, an amount of energy used to obtain a result, a quality of code, a quality of a result, a compactness of developed code, and a team size.

14. The computer program product as claimed in claim 13, wherein said method steps further comprise:

configuring said programmed processor as a leaderboard, said leaderboard automatically performing a ranking of said bidder team against each other team using said common set of metrics; and automatically updating said leaderboard by each submission and presenting said bidder team ranking to the provider.

15. The computer program product as claimed in claim 11, wherein a bidding team's model submission comprises:

a specification defining and initializing a machine-learned model including any input data pre-processing and hyperparameter values for training said model; and a specification further comprising a flow of said input data through said defined and initialized machine-learned model including any post-processing of a model output data.

* * * * *